March 12, 1929.  A. G. RAYBURN ET AL  1,705,137
SPRING SUSPENSION FOR VEHICLES
Original Filed Aug. 6, 1923
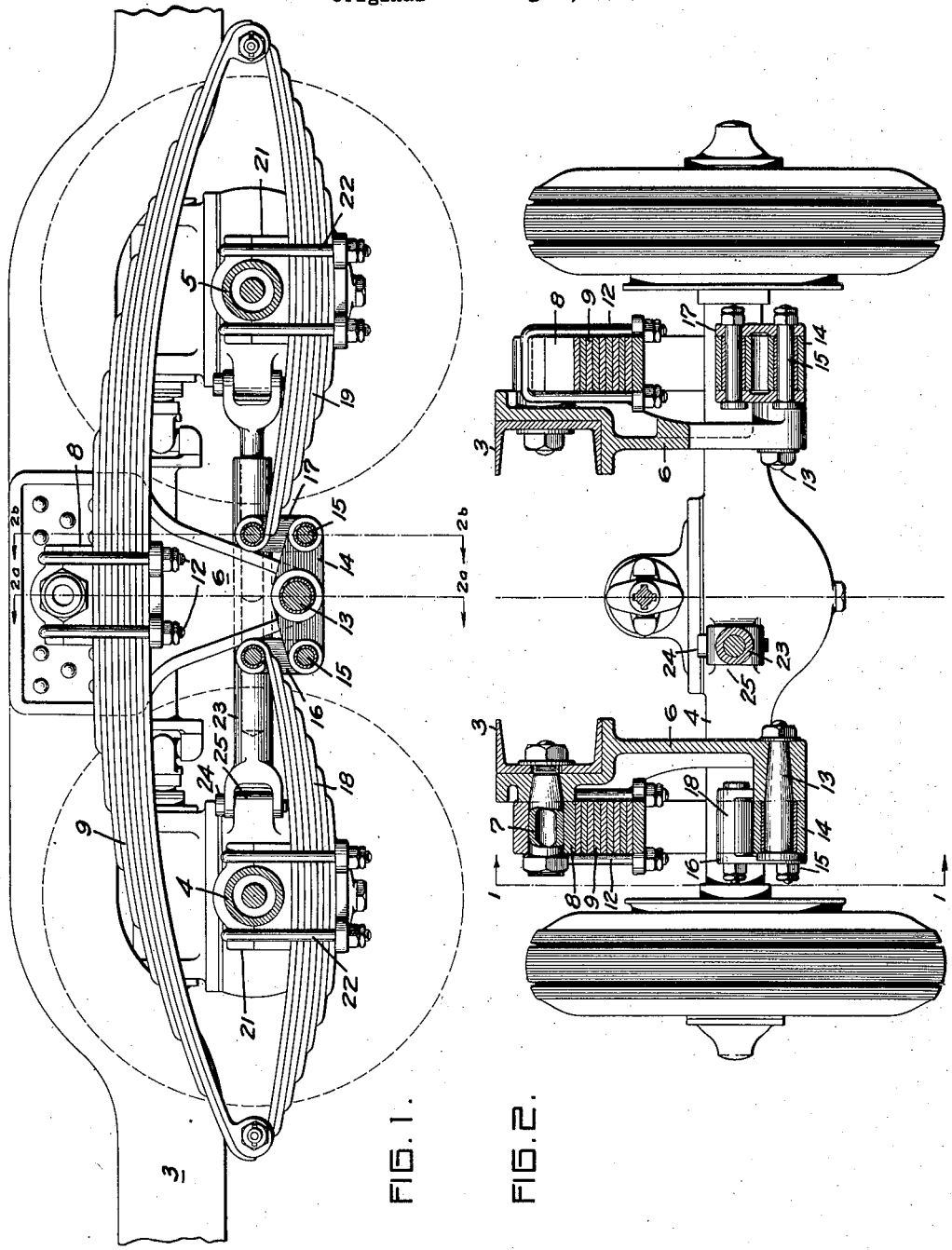
WITNESS:
H. Sherburne
INVENTORS
Alden G. Rayburn.
James W. Sumner.
BY White Prost & Evans
their ATTORNEYS Patented Mar. 12, 1929.

1,705,137

UNITED STATES PATENT OFFICE.

ALDEN G. RAYBURN, OF SAUSALITO, AND JAMES W. SUMNER, OF LOS ANGELES, CALIFORNIA, ASSIGNORS TO EMORY WINSHIP, OF SAN FRANCISCO, CALIFORNIA.

SPRING SUSPENSION FOR VEHICLES.

Application filed August 6, 1923, Serial No. 655,842. Renewed August 1, 1928.

The invention relates to a spring suspension for road vehicles, such as motor trucks and motor stages and particularly to a spring suspension for a tandem axle construction. The spring suspension is adapted for use on six-wheeled or eight-wheeled vehicles in which two axles are arranged in tandem, at one end or both ends of the vehicle.

An object of the invention is to provide a spring suspension for tandem axles which will permit independent vertical movement of the two axles.

Another object of the invention is to provide a spring suspension for a tandem axle construction which minimizes the road shocks transferred to the vehicle frame.

A further object of the invention is to provide a spring suspension for a tandem axle construction in which the road shocks imparted to one axle are partially transferred to the other axle to minimize the effect on the vehicle frame.

The invention possesses other advantageous features, some of which with the foregoing, will be set forth at length in the following description, where we shall outline in full that form of the invention which we have selected for illustration in the drawings accompanying and forming part of the present specification. In said drawings, we have shown one embodiment of our invention, but it is to be understood that we do not limit ourselves to such form since the invention, as set forth in the claims, may be embodied in a plurality of forms.

Referring to said drawings:

Figure 1 is a vertical section taken on the line 1—1, Figure 2.

Figure 2 is a composite vertical section, the left half of the figure being a vertical section taken on the line 2ª—2ª, Figure 1, and the right half of the figure being a vertical section taken on the line 2ᵇ—2ᵇ, Figure 1.

The spring suspension of our invention is designed to produce exceptionally easy riding qualities of the vehicle. This is accomplished by the use of a very long spring, which is free to move at both ends and which possesses the flexibility inherent in long springs. Interposed between the long spring and the axles are shorter leaf springs which transmit the road shocks to each other and to the main long leaf spring, so that the road shocks transferred to the vehicle frame are minimized.

In Figure 1, we have shown the spring suspension applied to one pair of axles, but it is to be understood that in an eight-wheeled vehicle, the spring suspension may be applied to both sets of tandem axles. One spring suspension, such as is shown in Figure 1, is arranged on each side of the vehicle frame, for each pair of axles, so that the vehicle frame is supported on each side, at the front and rear, in the event of an eight wheeled construction, by a spring suspension, such as is shown in Figure 1.

Secured to the vehicle frame 3, at each side thereof, at a point midway between the axles 4—5, are brackets 6 on which the spring construction is mounted. Secured to each bracket is a stub-shaft 7 on which is journalled a bearing block 8 to which the main long leaf spring 9 is secured at its center by the U-bolts 12. The main long leaf spring is therefore pivotally mounted at its center on the vehicle frame.

The brackets 6 extend downward below the frame and at the lower end thereof is a pin or stub-shaft 13 on which the rocker arm 14 is pivotally mounted at its center. The rocker arm or equalizing bar is shown as a rigid lever, but may comprise a leaf spring, when flexibility therein is desired. The stub-shaft 13 is disposed vertically below the stub-shaft 7.

Connected to the end of the rocker arm 14 by the bolts 15, are links 16—17. Disposed below the main leaf spring 9 and connecting the free ends of the spring with the links 16 and 17 are shorter leaf springs 18—19 to which the axles 4—5 are connected at the center. Journaled on each axle is a bearing block 21 which is secured to the associated spring by the U-bolts 22. The axles are rotatable to a slight extent in the bearing block. Objectionable rotation of the axles is prevented by means of the telescopic torque rod 23 which is pivoted at each end by a vertical pivot 24 to a projection or extension 25 formed integral with or secured to the axle. This telescopic torque rod permits a slight rotational movement of the axle with respect to the bearing blocks mounted thereon and permits a slight change in the transverse spacing of the two axles. The shorter leaf springs 18 and 19 are pivotally connected at their remote ends to the ends of the main long leaf spring and are pivotally connected at their adjacent ends to the links 16 and 17 which are in turn pivotally connected to the rocker arm. By virtue of this construction the road shocks are first partially absorbed by the smaller leaf springs and the unabsorbed shock is transferred to the long flexible leaf spring, so that the shock which is transferred to the vehicle frame is reduced to a minimum. It will be observed that shocks transmitted to the long leaf spring from one of the short springs swing this spring about its pivotal mounting, transmitting a portion of the shock to the other small spring. Accordingly an arrangement is provided in which any unusual shocks to the spring that is individual to one axle is transmitted in part to the spring that is individual to the other axle.

We claim:

1. The combination with a vehicle frame, of a leaf spring pivoted at its center to said frame, a rocker arm pivoted to the frame below the leaf spring and a pair of shorter leaf springs each connected at one end to the ends of the first leaf spring and connected at their other ends to the rocker arm.

2. The combination with a vehicle frame, of a leaf spring pivoted at its center to the frame, a rocker arm pivoted at its center to the frame, the pivot of the rocker arm being vertically below the pivot of the leaf spring, a leaf spring connecting one end of the first spring with one end of the rocker arm and a leaf spring connecting the other end of the leaf spring with the other end of the rocker arm.

3. The combination with a vehicle frame, of a leaf spring pivoted at its center to the frame, a rocker arm pivoted at its center to the frame, the pivot of the rocker arm being vertically below the pivot of the leaf spring, a leaf spring connected at one end to the first leaf spring and shackled at its other end to the rocker arm and a leaf spring connected at one end to the other end of the first leaf spring and shackled at its other end to the rocker arm.

4. The combination with a vehicle frame, of a leaf spring attached at its center to the vehicle frame, a rocker arm pivoted to the vehicle frame below the center of the leaf spring, a shorter leaf spring connected at one end to one end of the first leaf spring, a link connecting the other end of the shorter leaf spring to one end of the rocker arm, a second short leaf spring connected at one end to the other end of the first leaf spring and a link connecting the other end of the second short leaf spring with the other end of the rocker arm.

5. The combination with a vehicle frame, of a rocker arm pivoted to the frame, a pair of leaf springs each connected at one end to opposite ends of the rocker arm and extending in opposite directions therefrom, an axle secured to each leaf spring intermediate its ends, a leaf spring connecting the remote ends of said pair of leaf springs and means connecting said last named leaf spring to the vehicle frame.

6. The combination with a vehicle frame, of a bracket secured to said frame, a shaft mounted in said bracket, a block mounted on said shaft, a long leaf spring secured at its center to said block, a second shaft mounted in the bracket below said first shaft, a rocker arm journalled on said second shaft, a pair of short leaf springs underlying the long leaf spring and each connected at one end to opposite ends of the long leaf spring, means flexibly connecting the other ends of the short leaf springs to the rocker arm and an axle secured to each short leaf spring intermediate its ends.

7. The combination with a vehicle frame, of a leaf spring pivoted at its center to said frame, a pair of shorter leaf springs each connected at their outer ends to the ends of the first leaf spring and pivoted at their centers each to one of a pair of tandem axles, and yielding means for connecting their inner ends whereby force exerted on one of said small springs may be partly transferred to the other of said small springs through said yielding connection.

8. A road vehicle comprising a frame, tandem axles, a spring for each axle, each axle being secured to its spring intermediate the ends of the spring, and means pivoted to the frame to couple both ends of the springs together, whereby shocks to one of the springs are absorbed in part by the other.

9. A road vehicle comprising a frame, a pair of axles supporting one end of said frame, a pair of wheels supporting each axle, a spring suspension interconnecting said axles and said frame at each side thereof, each spring suspension including a pair of springs each of which is rigidly secured to an axle between its ends, a lever pivoted between its ends to said frame between the adjacent ends of said pair of springs, shackles connecting said ends of said springs and the ends of said lever, and a member movably connected to the frame and directly pivoted at its ends to the remote ends of said pair of springs, whereby unusual shocks sustained by one of either pair of springs is partially transmitted to the other of said pair by said lever and said member.

10. A road vehicle comprising a body frame, a group of four wheels supporting one end of said frame, an equalizing spring suspension system for said group of four wheels comprising a member attached to said body frame, a set of rear springs each of which at its rear end has a pivot-pin mounting which is fixed with respect to said member, a set of front springs each of which at its forward end has a pivot-pin mounting which is fixed with respect to said member, each of said springs being associated with one of the wheels of said group, an equalizing bar between each front and rear spring and having a pivotal mounting that is fixed with respect to said body frame, and shackles connecting each equalizer bar with the adjacent ends of the two corresponding springs, said shackles being connected to the springs and equalizer bar by pivot-pin connections.

In testimony whereof, we have hereunto set our hands.

JAMES W. SUMNER.
ALDEN G. RAYBURN.